Nov. 29, 1960  G. DUFOUR  2,961,927
ROCKET LAUNCHING SYSTEMS
Filed Oct. 3, 1956  2 Sheets-Sheet 1
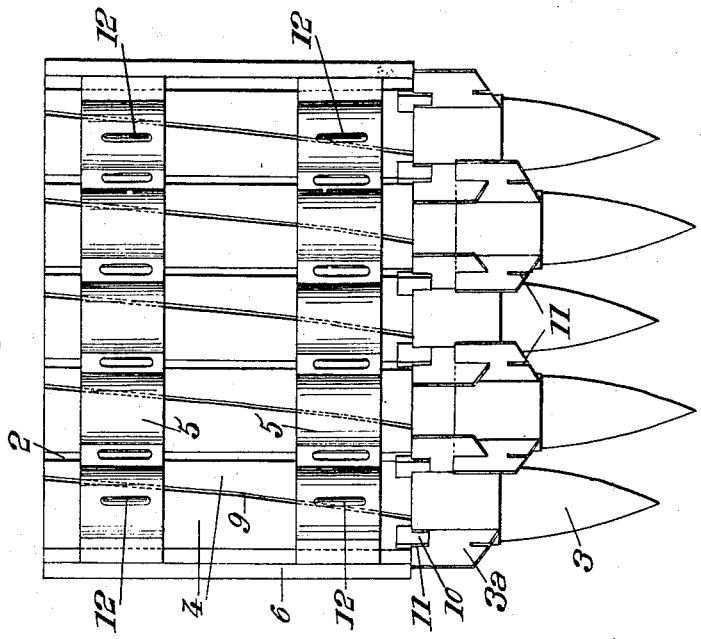
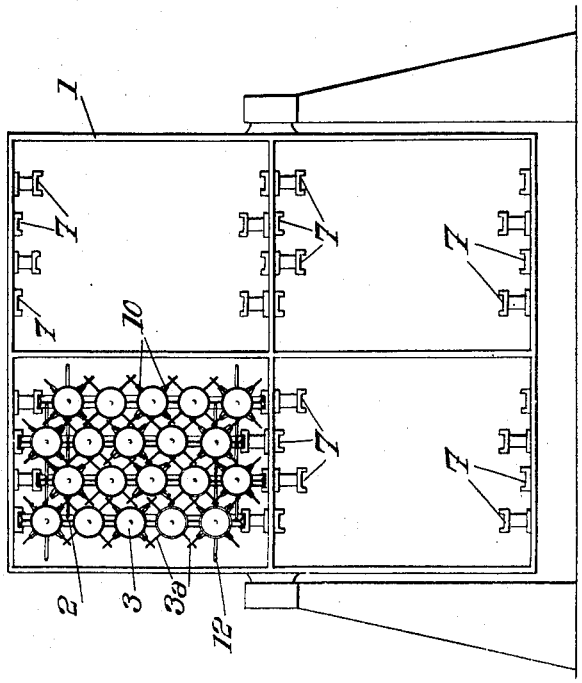

Nov. 29, 1960 G. DUFOUR 2,961,927
ROCKET LAUNCHING SYSTEMS
Filed Oct. 3, 1956 2 Sheets-Sheet 2

2,961,927

ROCKET LAUNCHING SYSTEMS

Georges Dufour, Geneva, Switzerland, assignor to Brevets Aero-Mecaniques S.A., Geneva, Switzerland, a society of Switzerland Filed Oct. 3, 1956, Ser. No. 613,643

Claims priority, application Luxembourg Oct. 4, 1955

6 Claims. (Cl. 89—1.7)

The present invention relates to rocket launching systems and it is more especially, although not exclusively, concerned with such systems for launching rockets of the type including a tail unit mounted slidable on the body of each rocket, said tail unit occupying, before the launching of the rocket, a forward position with respect to the rocket body and being driven along, when the rocket is being launched, by an abutment carried by said rocket body at the rear part thereof, when said abutment comes into contact with a corresponding part of said tail unit.

The object of my invention is to provide a system of this kind which is better adapted to meet the requirements of practice than those used up to the present time, especially concerning the facility and rapidity of charging of said system.

According to my invention such a system is essentially constituted by a frame, which may be adjustable in position so as to permit of aiming the rockets, and by a plurality of removable magazines or clips each filled in advance with a limited number of rockets, said clips being adapted to be inserted in said frame, whereby it suffices, in order to charge either wholly or partly the system, to substitute, for the magazines which have been emptied, new magazines filled with rockets.

Preferred embodiments of my invention will be hereinafter described with reference to the accompanying drawings, given merely by way of example and in which:

Fig. 1 diagrammatically shows, in front view, a rocket launching system according to the present invention.

Fig. 2 shows on an enlarged scale, and in a plan view, a magazine for five rockets intended to be used in such a system.

Figure 3:
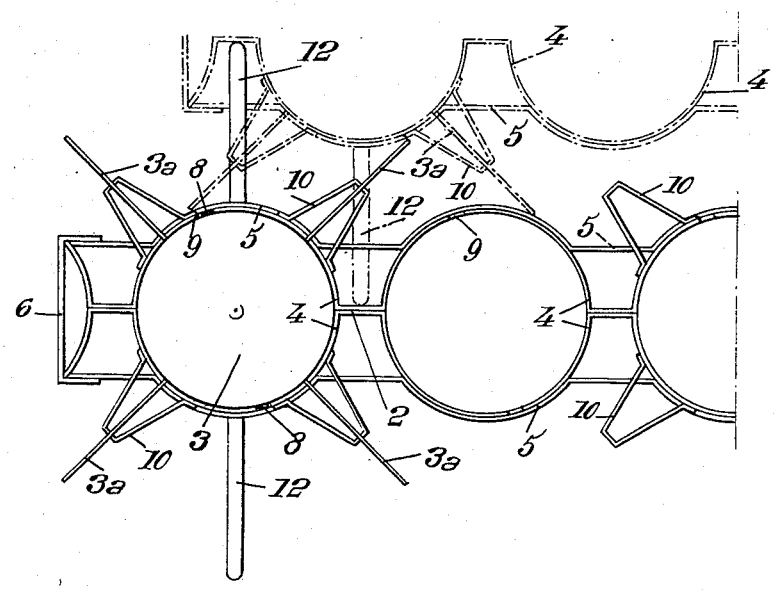
Fig. 3 shows a portion of said magazine in front view and on an enlarged scale.

The rocket launching system illustrated by the drawings includes a frame 1 intended to receive a plurality of rockets disposed parallel to one another and extending in a direction transverse to the general plane of said frame. Frame 1 is generally adjustable in position and it may be for instance pivotable about two axes, a horizontal one and a vertical one respectively, in the same manner as a gun mounted in a turret. Of course, when the rocket launching system is mounted on a vehicle, it may be made rotatable only about a horizontal axis so as to permit of adjusting the vertical angle of firing, and the direction of firing is obtained by displacing the vehicle itself.

It should also be noted that when the rocket launching system is mounted on an aircraft, frame 1 may be fixed with respect to said aircraft since in this case aiming of the rockets is obtained by bringing the aircraft itself in the desired position.

It has already been proposed to charge a frame such as 1 with rockets by fitting or inserting said rockets individually thereinto, but such a manner of proceeding involves serious drawbacks and in particular the following ones:

The charging operation requires a considerable time;

Special precautions must be taken when handling the rockets so as to fit them individually in the frame without injuring their tail units.

The object of my invention is to provide a rocket launching system which avoids these drawbacks.

According to said invention, as diagrammatically disclosed by Fig. 1, frame 1 is arranged in such manner as to be able to receive a plurality of removable magazines or clips 2, each of which is charged in advance with several rockets 3.

Thus, at the firing station, instead of being compelled to insert rockets 1 individually in frame 1, it suffices to substitute charged magazines for empty ones.

A single operation permits of charging a plurality of rockets (to wit the number of rockets contained in the magazine) and furthermore the rockets proper are not handled by the team of the rocket launching device.

The charging of magazines may be effected in safety at a distance from the launching system and by means of trained personnel capable of taking the necessary precautions in order to avoid deterioration of the rockets, and in particular of their tail units, when said rockets are inserted into the housings provided in each magazine to receive said rockets.

The only operations to be performed at the firing station consist in handling the magazines and such operations are quicker, simpler and less delicate than the operation of charging the magazines.

It should be noted that, during the magazine charging operation, some elements of rockets 3 may be temporarily removed or not inserted on said rockets, this in order to increase safety. For instance, the heads and/or the tail units may be conveyed separately to the firing station, the magazines being initially charged exclusively with the rocket bodies, which only contain the propelling charges.

Concerning the number of magazines to be mounted in the frame 1 and also the number of rockets to be placed in each magazine, these factors are of course determined in accordance with the power of fire to be obtained and with the weight of the rockets. In particular, and merely by way of indication, it should be noted that in the case of a system which must include from 70 to 80 rockets, each weighing about ten kilograms, it seems advantageous to provide a number of five rockets for every magazine, so that the weight of the magazine when charged is about 60 kilograms. Such a magazine can easily be handled by two men.

In a particular embodiment illustrated by the drawings (Figs. 2 and 3) each magazine includes a plurality of tubes 4 each intended to accommodate a rocket. These tubes 4 are connected together by transverse members 5 carrying guiding parts (such for instance as rails 6 extending on either side of the body of the magazine and parallel to the axes of tubes 4) intended to slide in slideways 7 provided on frame 1 (said slideways 7 being substantially perpendicular to the plane of said frame).

Advantageously, the whole of the tubes 4 of a magazine is obtained by assembling together stamped sheet elements each forming one half of the tubes and which are juxtaposed to each other so as to constitute said tubes. These elements are then assembled through suitable means, for instance by welding, and the whole is stiffened by transverse members 5 which may be constituted of metal plates having shapes conforming to the outlines of tubes 4 as clearly shown by Fig. 3.

It should be noted that each tube 4 may be used not only to maintain the corresponding rocket, but also to give it a movement of rotation about its axis. For this purpose each rocket body carries at least one lug 8 (preferably two such lugs disposed on opposite ends of a given diameter) said lugs being guided in a helical groove 9 provided in the wall of each tube.

Figure 4:
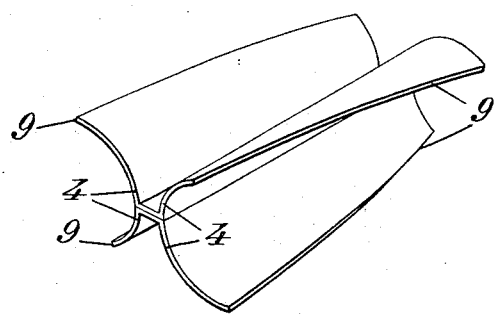
Fig. 4 is a perspective view of an element of the magazine illustrated by Fig. 3.

In this particular case, each of the elements the assembly of which constitutes tubes 4 will extend from the edge of the groove 9 of each of said tubes to the edge of the groove of the next tube 4. Fig. 4 shows in assembly position two complementary elements made in this way.

Means are provided for preventing the tail units 3a of the rockets from turning about their respective axes. Such means are constituted, in the example shown by the drawings, by providing at the front part of at least some of the tubes 4, supports 10 disposed and arranged in such manner that slots 11 provided in the blades of tail units 3a engage thereon.

It is pointed out that it is not necessary to provide such supports 10 on every tube 4 because, some of the tail units being thus fixed directly on the magazine so as to be prevented from rotating, these tail units may be used to prevent the tail units of other rockets from rotating about their respective axes, these last mentioned tail units being then offset toward the front with respect to the first mentioned ones.

For instance, in the case of a magazine containing five rockets, the tail units of the middle rocket and of the two end rockets are engaged on supports 10 so as to prevent rotation thereof, whereas the tail units of the two intermediate rockets are engaged on the tail units of the three first mentioned rockets as clearly shown by Fig. 2.

In this particular case, since some rockets bear, through the tail unit blades, upon the blades of the tail units of the other rockets which are disposed slightly rearwardly of them, it is necessary to fire first the rockets located at the front and to fire only thereafter the rockets located at their rear. In order to comply with this condition I may have recourse to electrical locking means.

On the other hand, it is of interest to provide each magazine with handles 12 or the like intended to facilitate handling thereof. Preferably, these handles are located on cross members 5 and their height is such that when a first magazine is resting through its handles upon a second magazine, there must be no interengagement between the tail units of the rockets carried by said two magazines. In this way it is possible to store up filled magazines by piling them upon one another without running any risk of deterioration of the tail units of the rockets. When it is desired to store up empty magazines it suffices to cause the handles 12 to coincide with the intervals between tubes 4 whereby the height of the stack of magazines is reduced. The magazines above stated are advantageously provided with a device to improve the firing of the rockets. In particular, each tube 4 may be provided with a rear holding device capable of releasing the rocket only when the thrust produced by the propelling thrust of said rocket reaches a predetermined value, such holding device being already known for other launching systems.

Finally, it should be indicated that in order to improve the precision of firing, each magazine (that is to say the plurality of tubes 4 essentially constituting said magazine) may be made of a length greater than that of the rockets, for instance equal to twice this length. Of course, in this case, the noses or forward ends of the rockets do not project, before launching, forward of the guiding tubes.

In this way I increase both the length along which the rockets are guided and the velocity of said rockets as they leave the guiding tubes 4.

When such magazines having long guiding tubes are intended to receive rockets having slidable tail units, the slidable tail units are located on the outside and at the front of the tubes 4 intended to receive said rockets and each rocket catches its tail unit when the rear end of the body of the rocket reaches the front end of the tube.

It should be noted that since the velocity of the rocket as it catches its tail unit is then higher than when the tubes 4 are of the same length as the rockets, the abutment provided at the rear of the rocket should be accordingly dimensioned. In particular, if this abutment is of frusto-conical shape, it is advisable either to increase the apex angle of the cone it forms or to increase its length so as to avoid any risk of said abutment fully passing right through the sleeve of the tail unit as a consequence of the higher velocity of the rocket.

Finally, it should be pointed out that when the length of tubes 4 is greater than the length of the rockets, the magazines could be used for launching rockets having a retractable tail unit. Of course, such rockets may be launched also by means of magazines in which the length of the tubes 4 is substantially equal to that of the rocket body.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A rocket launching system which comprises, in combination, an open frame the sections of which parallel to a given plane are rectangular, a plurality of clips each capable of holding several rockets, each of said clips including a plurality of parallel tubes disposed side by side and each capable of accommodating a rocket body so that said rockets can be launched therefrom, at least two members rigidly assembled with said tubes transversely thereto and guiding rails parallel to said tubes rigidly carried by the ends of said members, and slideways fixed to said frame extending transversely to said plane, said rails being adapted slidably to engage in said slideways.

2. A rocket launching system according to claim 1, for use with rockets including a tail unit slidable with respect to the body thereof and located, before the launching of the rocket, on the front part of said body, said launching device including means, carried by said tubes, for engaging at least some of said tail units to prevent rotation thereof about their respective axes with respect to said tubes.

3. A rocket launching system according to claim 1, further including handles fixed to said transverse members and extending in a direction transverse to the plane of the axes of said tubes.

4. A rocket launching system according to claim 1, in which said tubes consist each of two elements, each of semi-circular cross section, assembled opposite each other.

5. A rocket launching system according to claim 4, in which the corresponding elements of two adjacent tubes are rigid together, said elements being made of two portions having helical edges.

6. A rocket launching system which comprises, in combination, a frame having at least one open face, a plurality of clips capable of being fitted in juxtaposed relation to one another in said frame, guide means carried by said frame extending generally perpendicularly with respect to the open face of said frame for detachably securing said plurality of clips in said frame in parallel relation, means on said clips for cooperating with said guide means, each of said clips including, fixed therein, a plurality of tubular rocket holding elements each adapted to receive a rocket, all of said tubular rocket holding elements extending in a direction disposed at a substantial angle with respect to the plane of the open face of said frame.

References Cited in the file of this patent

UNITED STATES PATENTS

| | | |
|---|---|---|
| 2,356,413 | Leighton | Aug. 22, 1944 |
| 2,481,910 | D'Ardenne | Sept. 13, 1949 |
| 2,660,506 | Wright | Nov. 24, 1953 |

FOREIGN PATENTS

| | | |
|---|---|---|
| 863,443 | France | Jan. 2, 1941 |
| 974,679 | France | Oct. 4, 1950 |
| 130,841 | Sweden | Feb. 13, 1951 |
| 1,102,333 | France | May 4, 1955 |
| 932,348 | Germany | Aug. 29, 1955 |